US008891021B2

(12) United States Patent
Li et al.

(10) Patent No.: US 8,891,021 B2
(45) Date of Patent: Nov. 18, 2014

(54) SYSTEM AND METHOD OF DETECTING STROBE USING TEMPORAL WINDOW

(71) Applicant: General Instrument Corporation, Horsham, PA (US)

(72) Inventors: Renxiang Li, Lake Zurich, IL (US); Faisal Ishtiaq, Chicago, IL (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 13/858,923

(22) Filed: Apr. 8, 2013

(65) Prior Publication Data

US 2014/0267923 A1    Sep. 18, 2014

Related U.S. Application Data

(60) Provisional application No. 61/799,839, filed on Mar. 15, 2013, provisional application No. 61/803,315, filed on Mar. 19, 2013.

(51) Int. Cl.
*H04N 9/77*    (2006.01)
*H04N 5/40*    (2006.01)

(52) U.S. Cl.
CPC ........................... *H04N 9/77* (2013.01)
USPC .......................... 348/712; 348/724

(58) Field of Classification Search
USPC .................. 348/712, 713, 708, 723, 724, 571
IPC ................................ H04N 9/77,9/64, 5/38, 5/40
See application file for complete search history.

(56) References Cited

U.S. PATENT DOCUMENTS

| 5,828,378 | A  | * | 10/1998 | Shiraishi ........................ 345/422 |
| 7,095,451 | B2 | * | 8/2006  | Kitazawa et al. ............. 348/712 |
| 7,880,815 | B2 |   | 2/2011  | Yeh et al. |
| 8,139,157 | B2 | * | 3/2012  | Someya et al. ............... 348/712 |
| 2006/0152634 | A1 |   | 7/2006  | Yeh et al. |

(Continued)

FOREIGN PATENT DOCUMENTS

| EP | 2056587 A1 | 5/2009 |
| EP | 1048169 B1 | 5/2010 |

(Continued)

OTHER PUBLICATIONS

Zhang, D., et al., "A New Shot Boundary Detection Algorithm", Microsoft China Research, 2001.

(Continued)

*Primary Examiner* — Sherrie Hsia
(74) *Attorney, Agent, or Firm* — Stewart M. Wiener

(57) ABSTRACT

A video processing device is provided that includes a buffer, a luminance component, a maximum threshold component, a minimum threshold component and a flagging component. The buffer can store frame image data for a plurality of video frames. The luminance component can generate a first luminance value corresponding to a first frame image data and can generate a second luminance value corresponding to a second frame image data. The maximum threshold component can generate a maximum indicator signal when the difference between the second luminance value and the first luminance value is greater than a maximum threshold. The minimum threshold component can generate a minimum indicator signal when the difference between the second luminance value and the first luminance value is less than a minimum threshold. The flagging component can generate a flagged signal based on the maximum indicator signal and the minimum indicator signal.

20 Claims, 13 Drawing Sheets

(56) References Cited

U.S. PATENT DOCUMENTS

| | | |
|---|---|---|
| 2008/0232765 A1 | 9/2008 | Patten et al. |
| 2009/0147142 A1 | 6/2009 | Wang |
| 2010/0284612 A1 | 11/2010 | Peters |
| 2012/0242864 A1 | 9/2012 | Pauli et al. |

FOREIGN PATENT DOCUMENTS

| | | |
|---|---|---|
| EP | 2187647 A1 | 5/2010 |
| WO | 9933261 A1 | 7/1999 |
| WO | 2009075845 A1 | 6/2009 |
| WO | 2009090586 A1 | 7/2009 |

OTHER PUBLICATIONS

Guimaraes, S., et al., "Video segmentation based on 2D image analysis", Pattern Recognition Letters 24, 2003, pp. 947-957.

Ekiza, C., et al., "Use of Morphological Filters in Detection of Flashes and Other Light Events in Video Sequences".

PCT Search Report & Written Opinion, RE: Application #PCT/US2014/025932; dated Jun. 25, 2014.

N. Benjama, et al., "Flashlight Detection in Indoor Sport Videos for Highlight Generation", ECTI-CON 2005: 2nd International Conference on Electrical Engineering/Electroinics, Computer, Telecommunications and Information Technology, Jan. 1, 2005, pp. 534-537.

\* cited by examiner

SYSTEM AND METHOD OF DETECTING STROBE USING TEMPORAL WINDOW

RELATED CASES

The present application claims priority from U.S. Provisional Application No. 61/799,839, filed Mar. 15, 2015, and from U.S. Provisional Applications No. 61/803,315, filed Mar. 19, 2013, the entire disclosures of which are incorporated herein by reference.

BACKGROUND

The present disclosure relates to a system for and method of detecting a strobe in an image frame of a video.

BRIEF SUMMARY OF THE DRAWINGS

The accompanying drawings, which are incorporated in and form a part of the specification, illustrate example embodiments and, together with the description, serve to explain the principles thereof. In the drawings.

DETAILED DESCRIPTION

The present disclosure is generally drawn to systems and methods of detecting a strobe within an image. Strobes are commonly produced in video. As a cinematic feature, it is often used to signal emotions or as a separator for the transition from one shot to another. Sometimes, strobes are due to physical reasons, such as the video source directly facing a directional light source. They strobe typically includes an extremely bright core, surrounded by a transition strip in which the strength of the brightness gradually degrades away from the core and eventually blends into the background.

Detecting and identifying a strobe within an image frame may be useful for many reasons. For example, image frames having strobes therein may need different encoding. Therefore, if a strobe can be recognized, appropriate encoding resources may be allocated. For purposes of discussion therein, identification of a strobe within an image will be discussed in conjunction with encoding. However, it should be noted that such discussion is merely for purposes of explanation, and is not to be limited.

Figure 1:
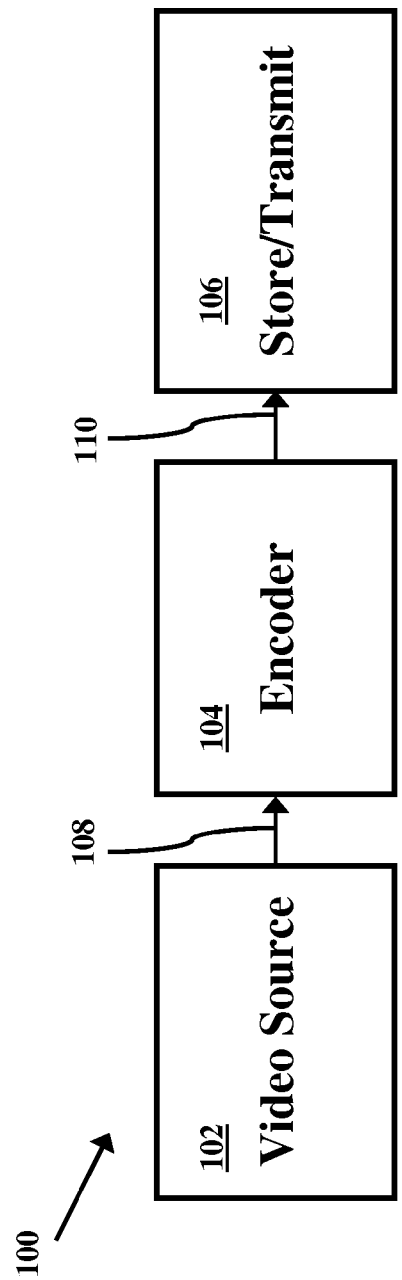
FIG. 1 illustrates an example conventional video system.

FIG. 1 illustrates a conventional video system 100. As shown in figure, conventional video system 100 includes a video source 102, an encoder 104 and a storage/transmission component 106. Non limiting examples of video source 102 include a media server, a camera, a video storage, a receiver and a video decoder (in the context of transcoding, where input video is first decoded and re-encoded into different size, format, etc).

Video source 102 is operable to provide image data 108 to encoder 104. Encoder 104 is operable to provide encoded data 110 to storage/transmission component 106.

In operation, video source 102 generates image data 108 as a series of still images, wherein each still image is called a frame. Each frame is composed of a plurality of pixels, wherein each pixel includes pixel data. Pixel data for each pixel includes at least one characteristic and an associated value of the characteristic(s) of that pixel. Non-limiting examples of characteristics include chrominance, luminance, etc. Luminance describes the amount of light that is emitted from a pixel. The associated value of the characteristic may be a detected value in a predetermined range. For example pixel data may include as a characteristic, the amount of detected red in the pixel, whereas the associated value is on a scale from 0 to 255, wherein zero is an indication that no red has been detected and 255 is an indication that a maximum amount of red has been detected. Similarly, in another example, pixel data include as a characteristic, the amount of detected luminance in the pixel, whereas the associated value is on a scale of 0 to 255, wherein zero is an indication of no detected luminance and 255 is an indication of maximum luminance.

It may be useful to be able to identify a strobe within a frame. As mentioned earlier for example, for purposes of encoding, additional encoding resources may be needed to encode a frame having a strobe. In particular, some encoding techniques rely on comparisons of adjacent frames to reduce the amount of data needed to describe a frame. In such encoding techniques, when there are large differences between adjacent frames, more data is required to encode such adjacent frames.

Encoder 104 encodes image data 108. The amount of resources needed to encode image data depends largely on the amount and type of data to be encoded.

To increase the quality of an image, multiple characteristics may be used for pixel data. To further increase the quality of an image, larger scales may be used in association with each characteristic. Still further, to increase the quality of an image, the number of pixels per frame may be increased. As the number of pixels increases, as the number of characteristics per pixel increases, and as the scale of each characteristic increases, the corresponding amount of data per image frame increases.

Figure 2:
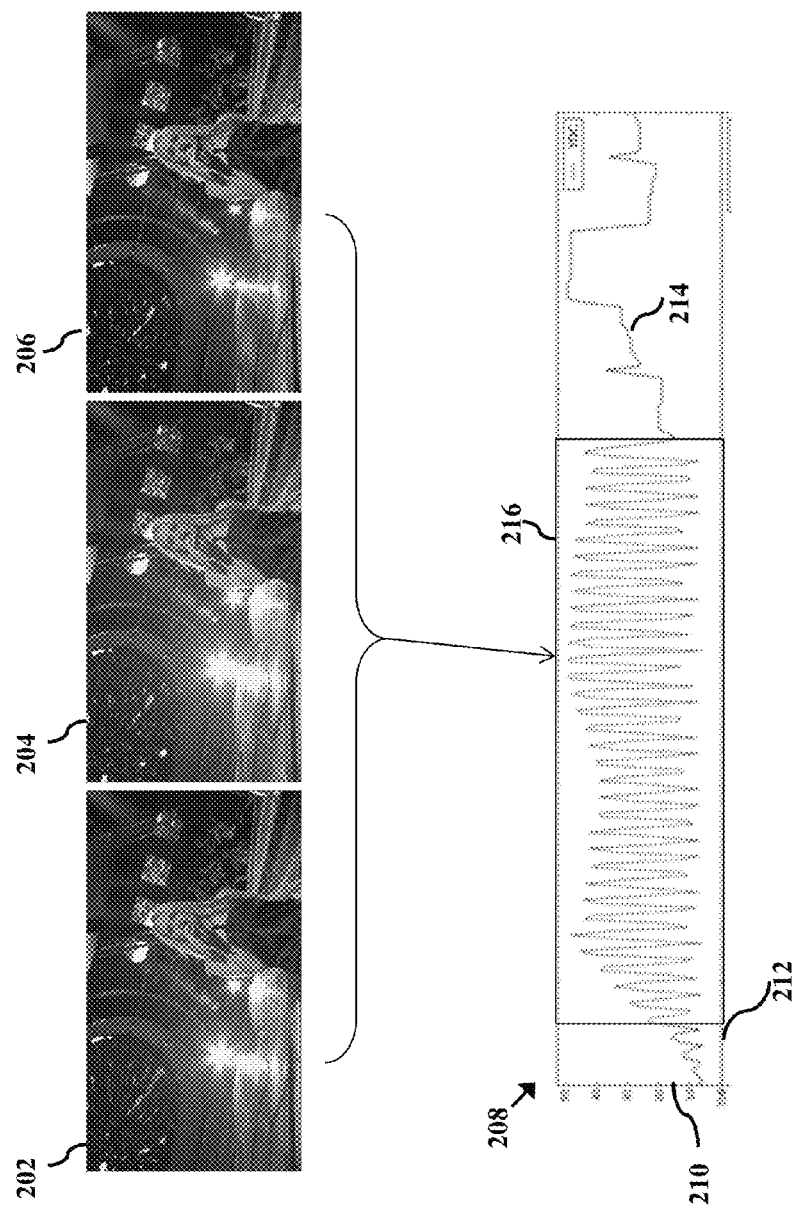
FIG. 2 illustrates a plurality of frames and a luminance graph corresponding to a plurality of strobe bursts.

FIG. 2 illustrates a plurality of frames and a luminance graph corresponding to a Type 1 strobe—a strobe burst. As shown in the figure, frames 202, 204 and 206 depict multiple frames of a singer in which a strobe is flashing in the background for a short burst, for example, 3 frames. Luminance graph 208 includes x-axis 212 of image frames, y-axis 210 of luminance value and a luminance function 214. One of the plurality of peaks in graph section 216 corresponds to the luminance of frames 202-206.

Luminance graph 208 can indicate the type of strobe being utilized. For example, within graph section 216, luminance function 214 fluctuates rapidly between a high luminance value and a low luminance value. A high luminance value indicates the presence of a bright light, whereas a low luminance value indicates the presence of a dim light, or no light at all. Therefore, in this example, as the luminance fluctuates rapidly between bright light and dim/no light, the assumption is made that the cause of these fluctuations is a strobe burst, pulsing light in a rapid manner.

Figure 3:
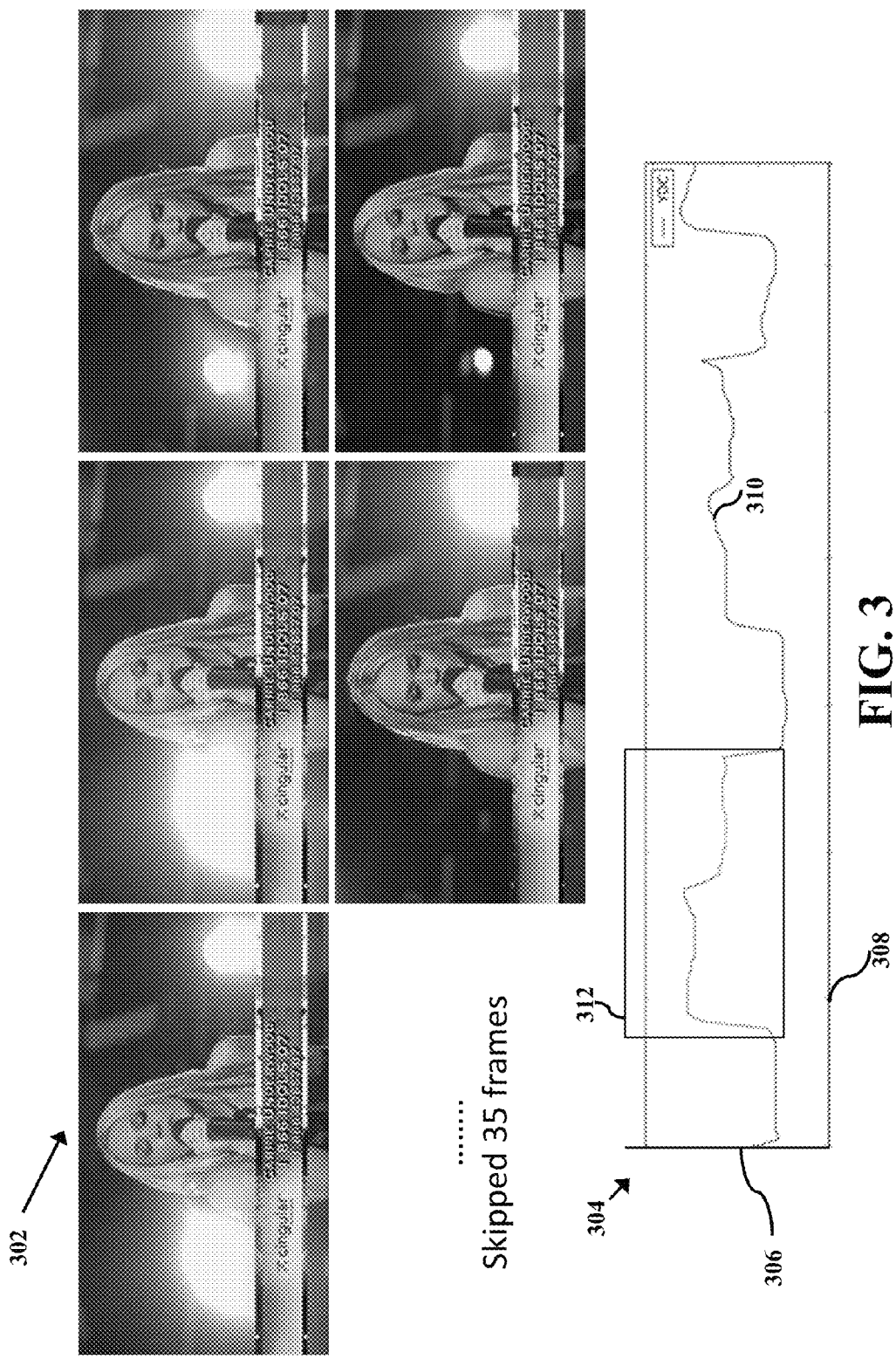
FIG. 3 illustrates a plurality of frames and a luminance graph corresponding to a long strobe.

Outside of graph section 216 luminance function 214 does not show the same characteristic fluctuation of a pulsing strobe, so the assumption is made that there is no strobe burst outside of graph section 216, FIG. 3 illustrates a plurality of frames and a luminance graph corresponding to a Type 2 strobe—a long strobe. As shown in the figure, frame set 302 comprises a plurality of individual frames of a singer. In this example, the total number of frames is 40, however any number of frames could be used. Luminance graph 304 includes x-axis 308 of image frames, y-axis 306 of luminance value and luminance function 310. Graph section 312 corresponds to the luminance of frame set 302.

Luminance graph 306 can indicate the type of strobe present in the plurality of frames. For example, within graph section 312, luminance function 310 remains relatively constant at a high luminance value. A high luminance value indicates the presence of a bright light, whereas a low luminance value indicates the presence of a dim light, or no light at all. Therefore, in this example, as the luminance remains relatively constant at a high luminance value, the assumption is made that the cause of the high luminance value is a constant source of bright light, as shown in frame set 302.

A frame having a large luminance value does not necessarily mean that the frame includes a strobe. However, a frame having a large luminance value is indicative of a potential strobe, either a Type 1 strobe discussed above with reference to FIG. 2, or the Type 2 strobe discussed above with reference to FIG. 3. In some embodiments disclosed herein, a frame having potential strobe may be verified as a frame having a strobe by analyzing the frame in light of neighboring frames. This will be described with reference to FIG. 4.

Figure 4:
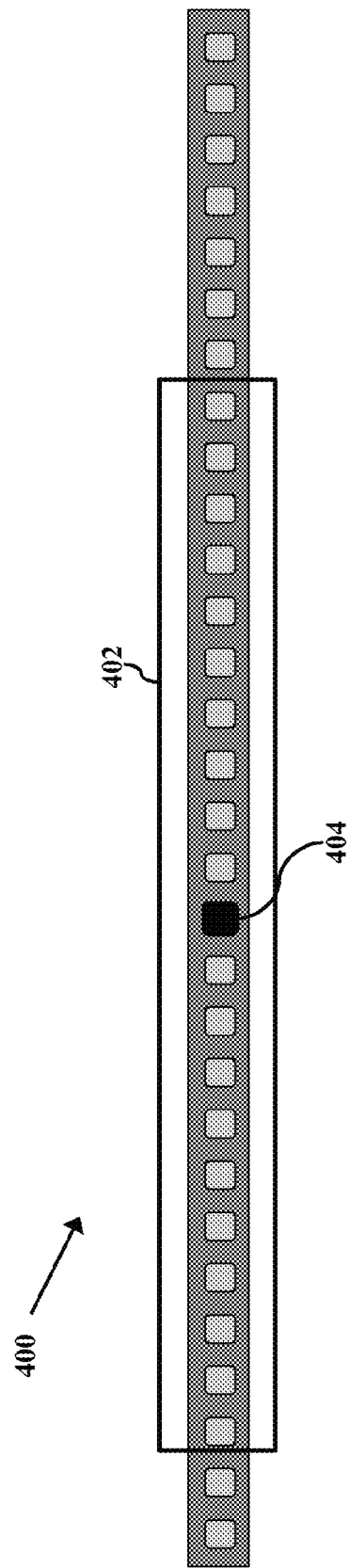
FIG. 4 illustrates a plurality of frames and a sliding window.

FIG. 4 illustrates a plurality of frames and a sliding window.

As shown in the figure, a plurality of frames 400 includes a number of frames, an example of which is indicated by frame 404, inside a frame window 402. In attempting to determine the presence of a strobe, relative luminance values are important, thus luminance values of sequential frames may be compared to determine if a strobe is present. For example, in a relatively dim restaurant, if someone were taking pictures with a flash, the flash may be considered a strobe since it would be a very bright light in comparison to the dim restaurant. However, if the same pictures were being taken in bright daylight, the flash may not be considered a strobe since it would not be a very bright light in comparison to the light from the sun.

Therefore, when processing a video, in order to determine if a strobe is present, the luminance value of a single frame may be compared to the luminance values of the adjacent frames. In FIG. 4, to determine whether frame 404 contains a strobe, the luminance value of frame 404 may be compared to the luminance values of the remaining frames within frame window 402. Additionally, frame window 402 is a sliding window, continuously moving as the target frame changes. An example embodiment of luminance values of the frames within frame window 402 will now be described with additional reference to FIG. 5.

Figure 5:
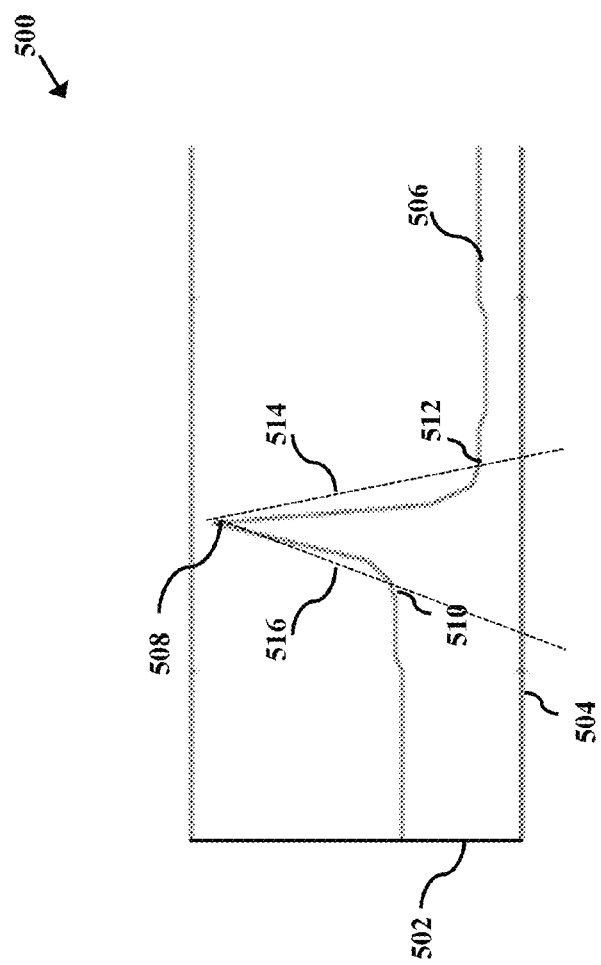
FIG. 5 illustrates a luminance graph having a luminance peak.

FIG. 5 illustrates a luminance graph 500 having a luminance peak. As shown in the figure, luminance graph 500 includes an x-axis 504 of image frames and a y-axis 502 of luminance value. A luminance function 506 corresponds to a stream of image frames. A peak is noted by 508, and is the luminance value of frame 404. This means that frame 404 has the maximum luminance value compared to that of other frames in the buffer. Item 510 corresponds to the luminance value of the beginning frame of the ramp up to peak 508, indicated by dotted line 516. Item 512 corresponds to the luminance value of the end frame of the ramp down from peak 508, indicated by dotted line 514.

Peak 508 indicated that frame 404 may potentially have a strobe therein. Further, the luminance value of frame 404 has to be larger than a predetermined threshold to be the peak of potential Type 1 strobe frames. To verify whether peak 508 indicated that frame 404 indeed includes a strobe, a group of frames may be analyzed. In this case, no frames on either side of frame 404 have a higher luminance than frame 404, indicating that frame 404 is exhibiting the highest luminance at peak 508, which is indicative of a burst strobe.

In adjusting the slopes of ramp estimates 514 and 516, the number of frames included in the strobe frames will change. The general shape of the peak is known when ramp up 510 and ramp down 512 have been identified, in that the luminance slope becomes flat at those points. Once peak 508 and peak ramp estimates 514 and 516 have been identified, the strobe frames corresponding the identified peak 508 is determined to be from frame 510 to frame 512.

In some cases, once peak 508 is identified, right side ramp estimate 514 may not provide useful feedback. This may indicate that the strobe encountered is not a burst strobe, but a long strobe, in which case the method for identifying the long strobe is discussed with reference to FIGS. 6-10.

Figure 6:
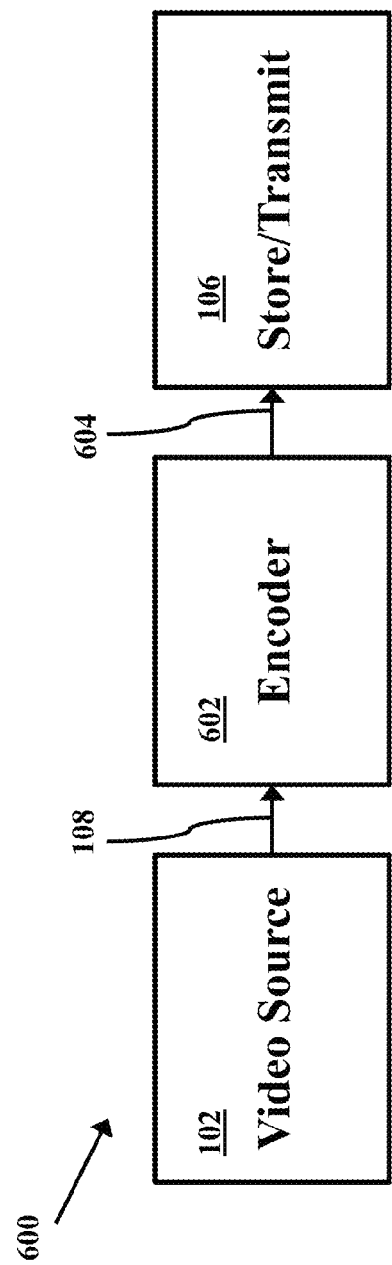
FIG. 6 illustrates another example video system.

FIG. 6 illustrates another example video system 600. As shown in the figure, system 600 includes video source 102, an encoder 602 and storage/transmission component 106. Encoder receives image data 108 and outputs encoded data 604.

Figure 7:
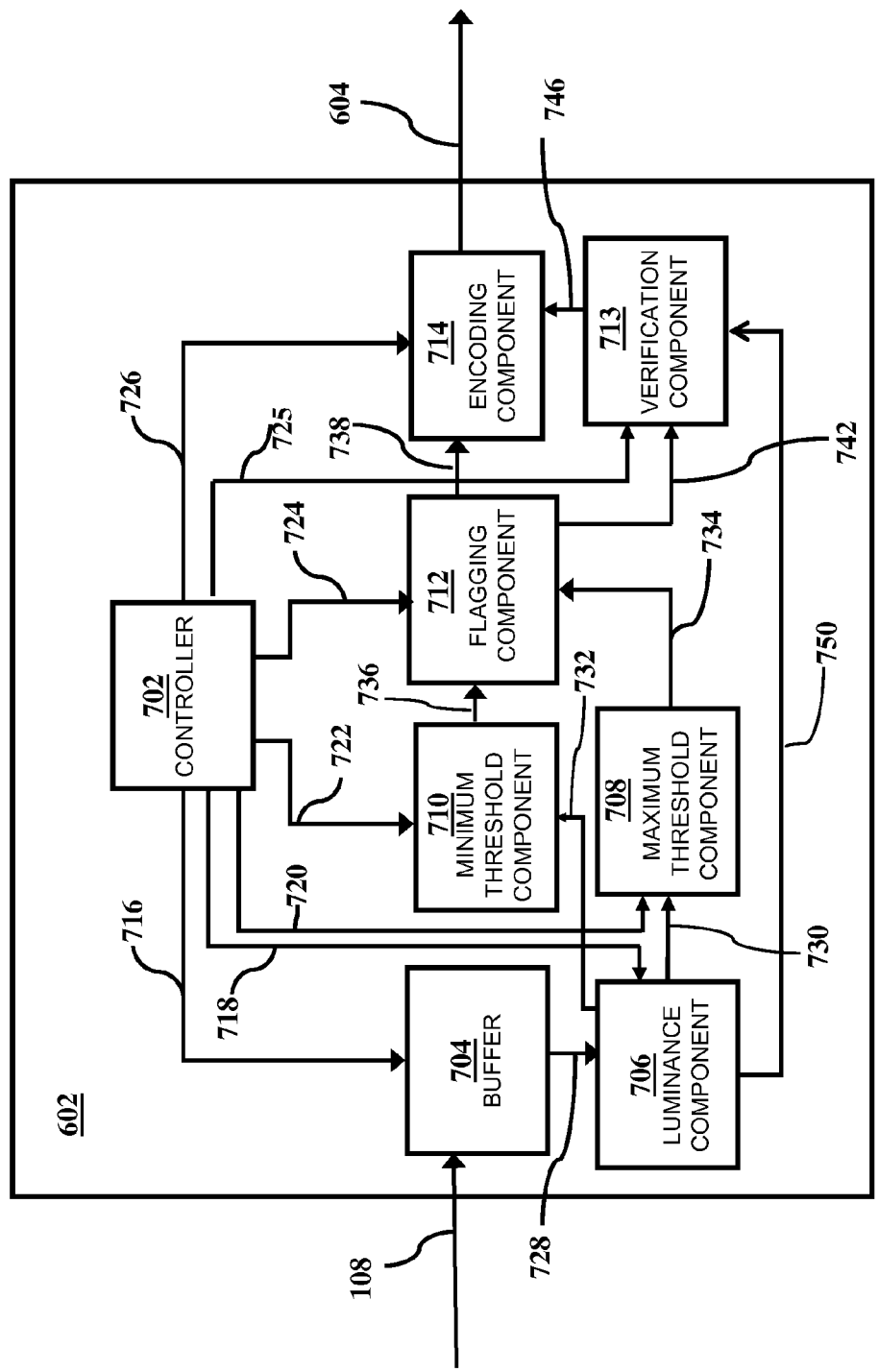
FIG. 7 illustrates an example encoder from the video system of FIG. 6.

FIG. 7 illustrates an example encoder 602 from the video system 600 of FIG. 6. As shown in FIG. 7, encoder 602 includes a controller 702, a buffer 704, a luminance component 706, a maximum threshold component 708, a minimum threshold component 710, a flagging component 712, a verification component 713 and an encoding component 714.

Controller 702 is operable to control buffer 704, luminance component 706, maximum threshold component 708, minimum threshold component 710, flagging component 712, verification component 713 and encoding component 714, via control signals 716, 718, 720, 722, 724, 725 and 726, respectively.

Buffer 704 is operable to store frame image data for a plurality of video frames. Luminance component 706 is operable to generate a first luminance value corresponding to a first image data from the buffered frame image data and to generate a second luminance value corresponding to a second frame image data from the buffered frame image data. Maximum threshold component 708 is operable to generate a maximum indicator signal when the difference between the second luminance value and the first luminance value is greater than a maximum threshold. Minimum threshold component 710 is operable to generate a minimum indicator signal when the difference between the second luminance value and the first luminance value is less than a minimum threshold. Flagging component 712 is operable to generate a flagged signal based on the maximum indicator signal and the minimum indicator signal. Verification component 713 is operable to generate verification signals indicating a verified strobe based on flagged signals from flagging component 712 and luminance value from luminance component 706. Encoding component 714 operable to encode at least one of the first frame image data and the second frame image data in a first manner or in a second manner based on the flagging signal and the verification signals.

Figure 8:
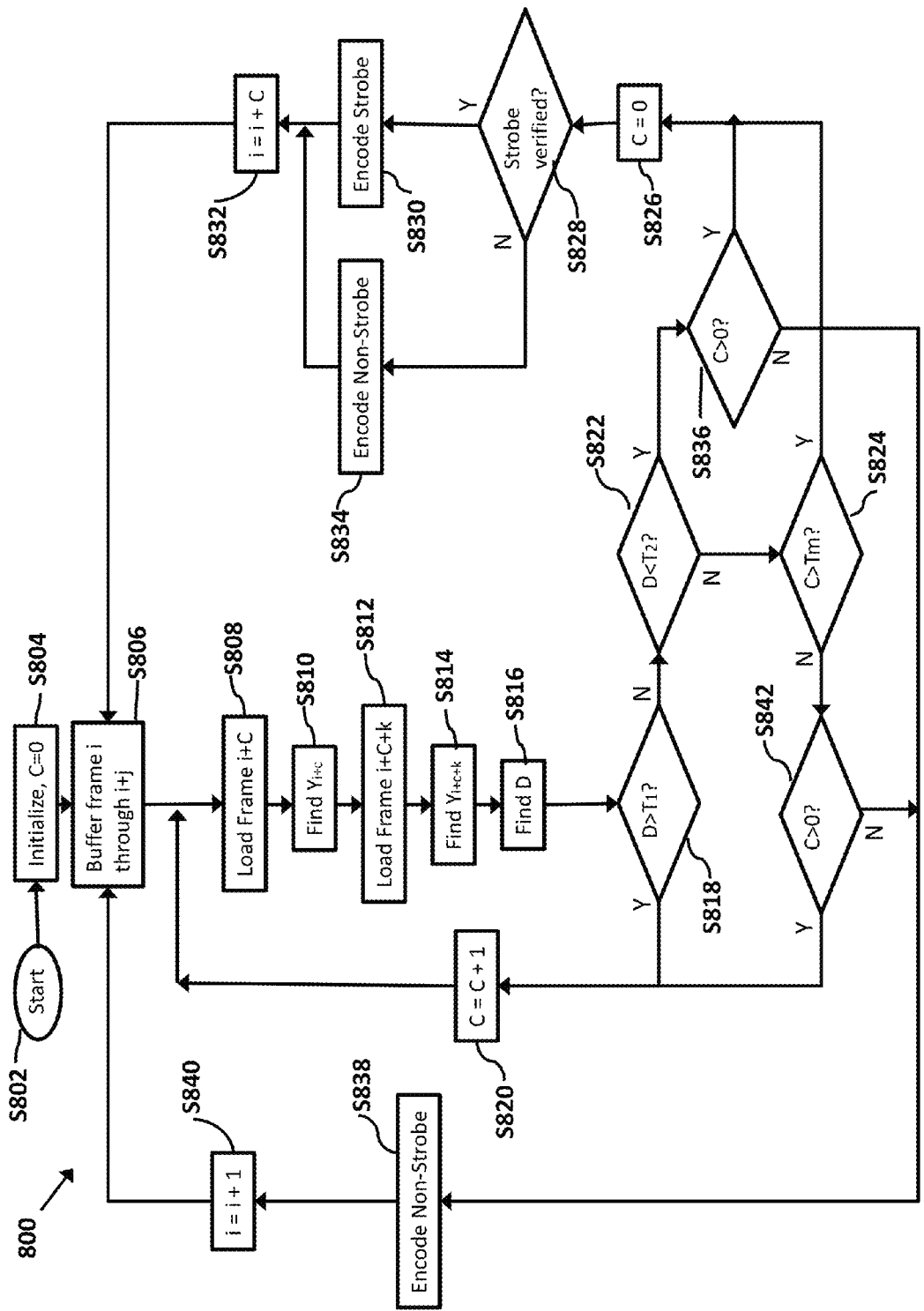
FIG. 8 illustrates an example method of operating the encoder of FIG. 7.

FIG. 8 illustrates an example method 800 of operating the encoder of FIG. 7. Method 800 will be described with additional reference to FIG. 9.

Method 800 starts (S802) and the system is initialized (S804). For example, controller 702 may initialize a counter value, C, corresponding to the number of potential strobe frames, as 0. The value of C is also used by the flagging component 712 to generate flagged signals. C>0 means strobe is flagged, i.e., the frames being analyzed are flagged as containing a potential strobe; C=0 means strobe is not flagged, i.e. the frames being analyzed are flagged as not containing a potential strobe. Resetting C to 0 means to remove the flagged condition.

A series of frames i through i+j are then buffered (S806). The number of frames may be any number suitable for the application. In one embodiment, the number of frames may be 40. Buffer 704 receives image data 108. A frame i+C is then loaded (S808). Frame i+C may be located anywhere within frames i to i+j. In one embodiment, frame i+C is located halfway between frame i and frame i+j. The luminance value $Y_{i+c}$ is then determined (S810). Buffer 704 passes the image data corresponding to the current frame, i+C, to luminance component 706 via signal 728. Luminance component 706 analyzes the luminance values of all the pixels in the current frame and takes their average to determine the luminance value $Y_{i+c}$.

Another frame i+C+k is then loaded (S812). Buffer 704 receives frame image data for a subsequent frame from image data 108. The subsequent frame may be a frame subsequent by a value k. For example in one embodiment, when k=1, the subsequent frame is the next frame after the current frame. In this example embodiment, let k=2.

The luminance value $Y_{i+c+k}$ is then determined (S814). Buffer 704 passes the image date corresponding to the frame, i+C+k, to luminance component 706 via signal 728. Luminance component 706 analyzes the luminance values of all the pixels in the frame i+C+k to determine the luminance value $Y_{i+c+k}$.

The luminance value differential D is then determined (S816). Luminance component 706 finds the luminance value differential D as the difference between the luminance value $Y_{i+c}$ and the luminance value $Y_{i+c+k}$. The differential D can be calculated either by forward differential or by backward differential. Since i, c and k are all positive indexes, forward differential is defined as $D=Y_{i+c}-Y_{i+c+k}$, and backward differential is defined as $D=Y_{i+c+k}-Y_{i+c}$. In the example embodiment, a backward differential is used.

It is then determined whether the luminance value differential D is greater than a predetermined first threshold $T_1$ (S818). Luminance component 706 provides the luminance value differential D to maximum threshold component 708 via signal 730 and to minimum threshold component 710 via signal 732. Maximum threshold component compares D to a predetermined threshold $T_1$, minimum threshold component compares D to a predetermined threshold $T_2$.

Figure 9:
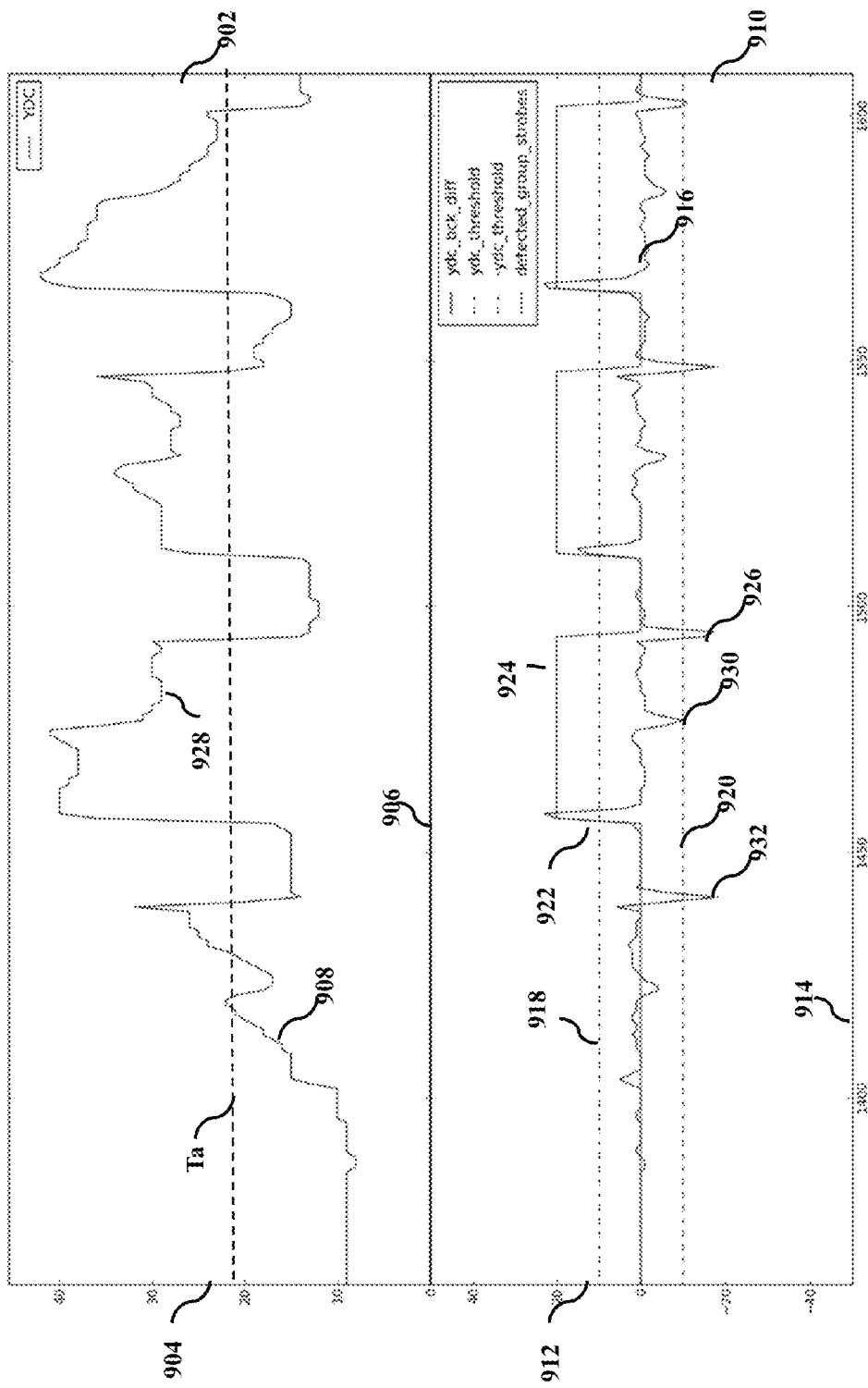
FIG. 9 illustrates example luminance functions and comparative functions.

FIG. 9 illustrates example luminance functions and comparative functions. In the figure, a first graph 902 has a y-axis 904 of luminance value and an x-axis 906 of frame number. Graph 902 additionally shows a luminance function 908 of a stream of frames. Also in the figure is a graph 910, having a y-axis 912 of a luminance value differential and an x-axis 914 of frame number. Graph 910 additionally includes a luminance differential function 916. A first threshold value $T_1$ is indicated as dotted line 918 on graph 910, whereas a second threshold value $T_2$ is indicated as dotted line 920 on graph 910.

The luminance value of a frame is compared with the luminance value of a previous frame. This difference corresponds to luminance differential function 916. In the example of FIG. 9, a current frame is compared to a second previous frame (not the immediately preceding frame). In other embodiments, any number of frames may be disposed between the current frame and the compared frame.

The comparison should highlight large differences in luminance between nearby frames. This may be used to locate a long strobe. For example, spike 922 is larger than the first threshold. This indicates that the corresponding frame in graph 902 has a luminance value that is much larger than the luminance value of its second previous frame. Spike 926 in graph 910 is lower than the second threshold. This indicates that the corresponding frame in graph 902 has a luminance value that is much lower than the luminance value of its second previous frame. In addition, the luminance value for a strobe frame shall be larger than a predetermined threshold $T_a$.

In general, to identify a long strobe, first the differential luminance between a frame i and a frame i-k is determined, where i is the current frame and k is an integer. Then it is determined whether this differential luminance is greater than a predetermined threshold. In this example, the first predetermined threshold is $T_1$ indicated by line 918. If it is greater, then the start of a strobe is indicated. Then the frames are continually analyzed until the differential luminance is less than a second predetermined threshold. In this example the second predetermined threshold is $T_2$ indicated by line 920. In this example therefore, a strobe is indicated at 924 from spike 922 to spike 926. The corresponding luminance value as shown in portion 928 of luminance function 908 of graph 902 clearly shows a high value.

With additional reference to FIG. 8, an example of $D>T_1$ (Y at S818), may be at spike 922 of FIG. 9. If $D>T_1$ (Y at S818), then the frame is flagged as potential strobe frame by incrementing the counter C so that it is greater than 0 (S820). The procedure then continues with the next frame i+C (S808).

If D is not greater than $T_1$ (N at S818), it is then determined whether the luminance value differential D is less than a predetermined second threshold $T_2$ (S822). Minimum threshold component 710 compares D to a predetermined threshold $T_2$. If D is not less than $T_2$ (N at S822), the counter value C is then compared with a predetermined threshold $T_m$ (S824). If C is greater than $T_m$ (Y at S824), it means the length of a potential strobe frames is larger than a predetermined threshold and the search for further strobe frames is forced to stop. The strobe counter C is then reset to 0 (S826), which also means unflag strobe.

If it is determined that potential strobe frames ended (by previous actions discussed above), all potential strobe frames (in total C of them) will be verified (S828). If all the potential strobe frames are verified (Y at S828), then, encoding component 714 is instructed to encode the frames in a first manner which is optimal for strobe frames (S830). Frame i is then incremented by C frames (S832) and the process begins again with another set of frames (S806).

If the potential strobe frames are not verified (N at S828), then encoding component 714 is instructed to encode the frames in a second manner which is optimal for non-strobe frames (S834). Frame i is then incremented by C frames (S832) and the process begins again with another set of frames (S806).

Regarding the operation of the verification component: the luminance component 706 provides the luminance value Y to the verification component 713 by signal 750. Also, the flagging component 712 provides the flagging signal to the verification component 713 by signal 742.

If it is determined that the current series of potential strobe frames ended, then they are verified (S828). If the absolute value of all of the D values for all the potential strobe frames, as calculated from the luminance values, are added together and averaged, the result is the overall average differential luminance. If the average differential luminance is larger than a predetermined threshold $T_3$, it may indicate the presence of a strobe. In another embodiment, in addition to the average differential luminance test against $T_3$, the sum of luminance values Y for each potential strobe frame is divided by the total number of potential strobe frames, C, and the result is the average luminance value. The average luminance value is tested against a predetermined threshold $T_4$. A potential strobe frame is verified only if its average luminance value is larger than $T_4$. In yet another embodiment, the maximum and minimum luminance value for all potential strobe frames are tested against predetermined threshold $T_5$ and $T_6$ respectively. The current series of potential strobe frames may be verified to be strobe frames only if the maximum luminance value is less than $T_5$ and the minimum luminance value is greater than $T_6$.

Returning to FIG. 8, if D<$T_2$ (Y at S822), it is determined whether a strobe has been flagged, i.e., C>0 (S836) in flagging component 714. An example of D<$T_2$ and the strobe being flagged (Y at S836), may be at spike 926 of FIG. 9. If flagged as a strobe by C>0 (Y at S836) then the strobe is unflagged by resetting C=0 (S826). The potential strobe frames are then verified as strobe/non-strobe (S828) as previously described, and the frame may be encoded as a strobe (S830) or non-strobe (S834). For example, returning to FIG. 9, if the strobe was flagged (C>0) and D>$T_1$, as seen for example at spike 922 (corresponding to S818), then the strobe will stay flagged until D<$T_2$, or until C>$T_m$ (S824). In this example, it happens at spike 926. As such, the long strobe lasts for all frames between spike 922 and spike 926. This is seen as portion 928 of graph 902 and section 924 of graph 910.

Returning to FIG. 8, if not flagged as a strobe, i.e., C is not greater than 0 (N at S836), then the frame is encoded as a non-strobe (S838). For example, returning to FIG. 9, if the strobe was not flagged and D<$T_2$, as seen for example at spike 932, then the frame is not considered as having a strobe.

Frame i is then incremented by 1 frame (S840) and the process begins again a with another set of frames (S806).

If C<$T_m$ (N at S824), then the frame is a potential strobe frame, and it is determined whether C>0 (S842) For example, returning to FIG. 9, if the strobe was flagged and D is not less than $T_2$, as seen for example at spike 930, then there is still a potential strobe. Until the bottom threshold is surpassed the strobe continues. In the example of FIG. 9, strobe 924 continues past spike 930 to spike 926.

If C is not greater than $T_m$, and if strobe is not flagged (N at S842), then the frame is encoded as a non-strobe (S838).

The buffer index i is then incremented to the next frame (S840) and method 800 continues. If, however, strobe is flagged (Y at S842), the counter C is incremented (meaning strobe is still flagged), and processing continues (S808).

The above discussion with reference to FIGS. 6-9 describes embodiments where a strobe is identified by analyzing an entire frame. However, in accordance with other embodiments, a strobe may be identified by analyzing portions of a frame. Other embodiments includes a system that receives a frame, partitions the frame into m regions where regions may overlap each other, calculates and buffers luminance value (Y) for each region at a dedicated temporal buffer for that region. A peak (for Type 1) may then be detected within a buffer for each region. If a peak is detected, the ramp up and ramp down in the buffer are used to mark regions where peak strobes are detected. A difference between luminance values of frames are used for Type 2 strobe detection. Type 2 strobe existence is then verified by checking luminance fluctuation during the strobe period. If detected and verified, a Type 2 strobe is indicated for the frames.

Figure 10:
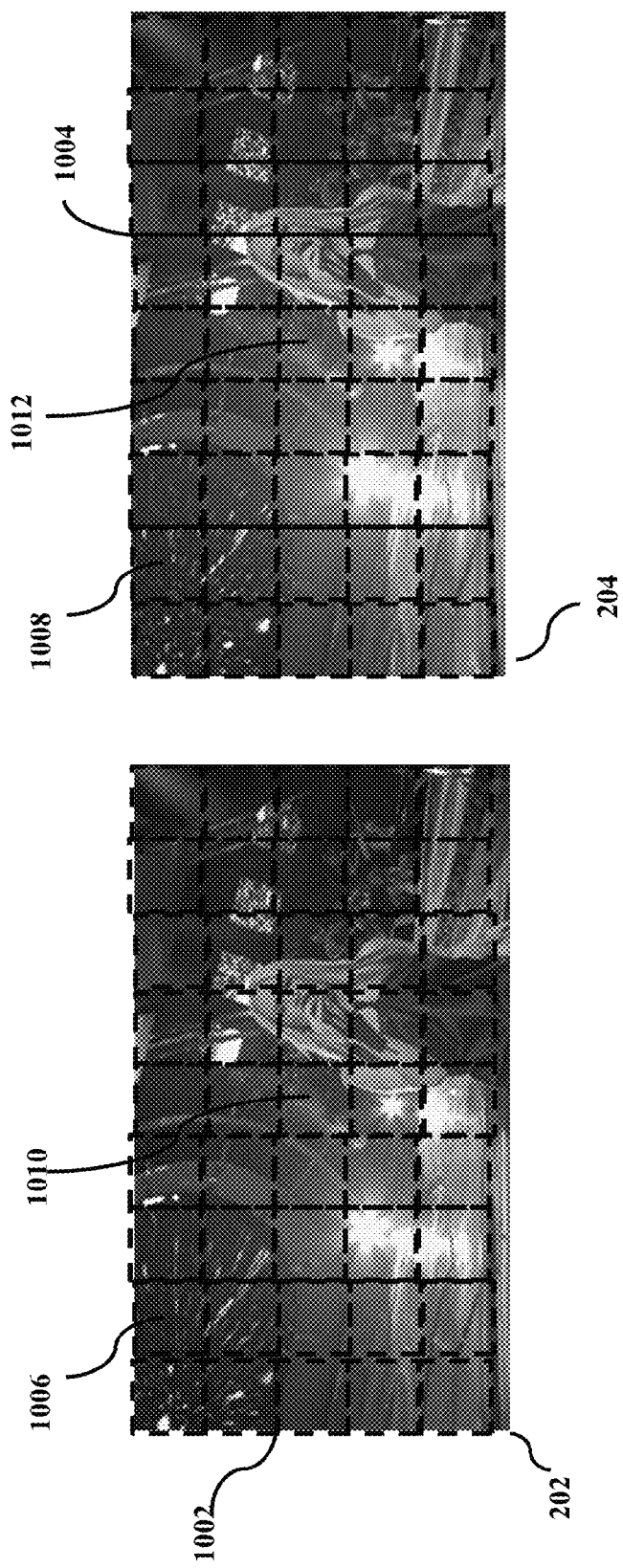
FIG. 10 illustrates two example image frames as divided into a plurality of sections.

FIG. 10 illustrates image frame 202 as divided into a plurality of sections 1002 and image frame 204 as divided into a plurality of sections 1004.

Figure 11:
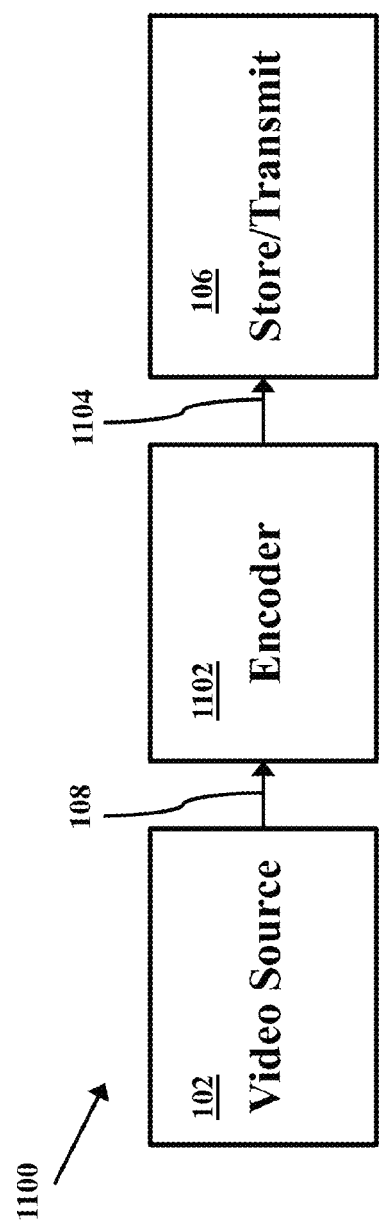
FIG. 11 illustrates another example video system.

FIG. 11 illustrates another example video system 1100. As shown in the figure, video system 1100 includes video source 102, an encoder 1102 and storage/transmission component 106. Video source 102 to is operable to provide image data 108 to encoder 1102. Encoder 1102 is operable to provide encoded data 1104 to storage/transmission component 106. Video system 1100 is similar to video system 600 of FIG. 6, but differs in the sense that encoder 1102 will process an image frame by processing the plurality of sections.

Figure 12:
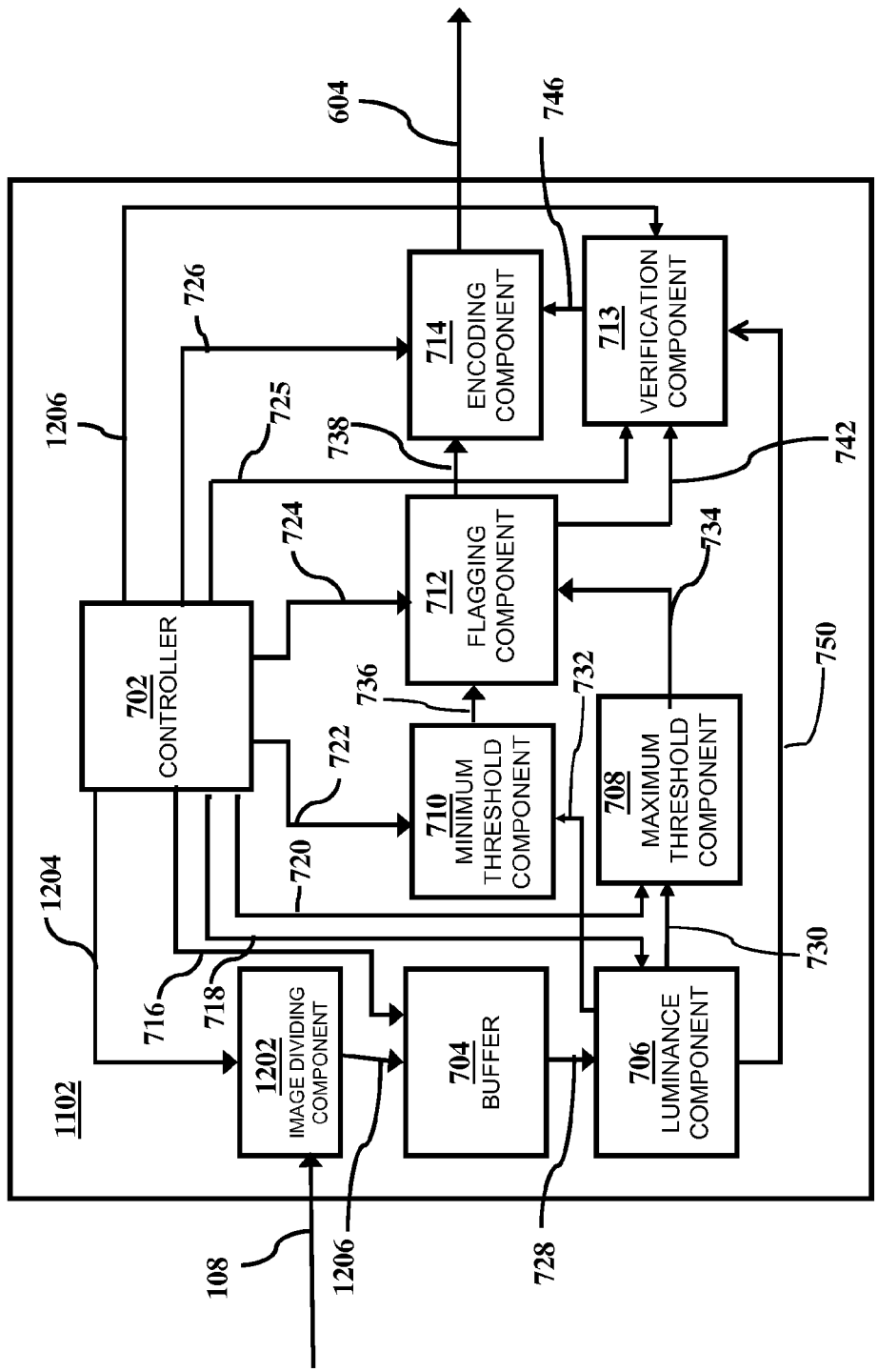
FIG. 12 illustrates example components of the encoder of FIG. 11.

FIG. 12 illustrates example components of encoder 1102. As shown in the figure, encoder 1102 includes controlling component 702, an image dividing component 1202, buffer 704, luminance component 706, maximum threshold component 708, minimum threshold component 710, flagging component 712, verification component 713 and encoding component 714.

Controlling component 702 is operable to control image dividing component 1202, buffer 704, luminance component 706, maximum threshold component 708, minimum threshold component 710, flagging component 712, verification component 713 and encoding component 714, via control signals 1204, 716, 718, 720, 722, 724, 725 and 726, respectively.

Image dividing component 1202 is configured to receive image data 108 and control signal 1204. Image dividing component 1202 is operable to generate sections of image data based on image data 108 and output the sections of image data 1206.

Buffer 704 is operable to store sectional frame image data for a plurality of video frames. Luminance component 706 is operable to generate a first luminance value corresponding to a first sectional image data from the buffered sectional frame image data and to generate a second luminance value corresponding to a second sectional frame image data from the buffered sectional frame image data. Maximum threshold component 708 is operable to generate a maximum indicator signal when the difference between the second luminance value and the first luminance value is greater than a maximum threshold. Minimum threshold component 710 is operable to generate a minimum indicator signal when the difference between the second luminance value and the first luminance value is less than a minimum threshold. Flagging component 712 is operable to generate a flagged signal based on the maximum indicator signal and the minimum indicator signal. Verification component 713 is operable to generate verification signals indicating a verified strobe based on flagged signals from flagging component 712 and luminance value from luminance component 706. Encoding component 714 is operable to encode at least one of the first sectional frame image data and the second sectional frame image data in a first manner or in a second manner based on the flagging signal and the verification signals.

Encoder 1102 is similar to encoder 602 of FIG. 7, but differs in the sense that encoder 1102 includes image dividing component 1202 and controlling component 702 is additionally able to control image dividing component 1202.

Figures 13A, 13B:
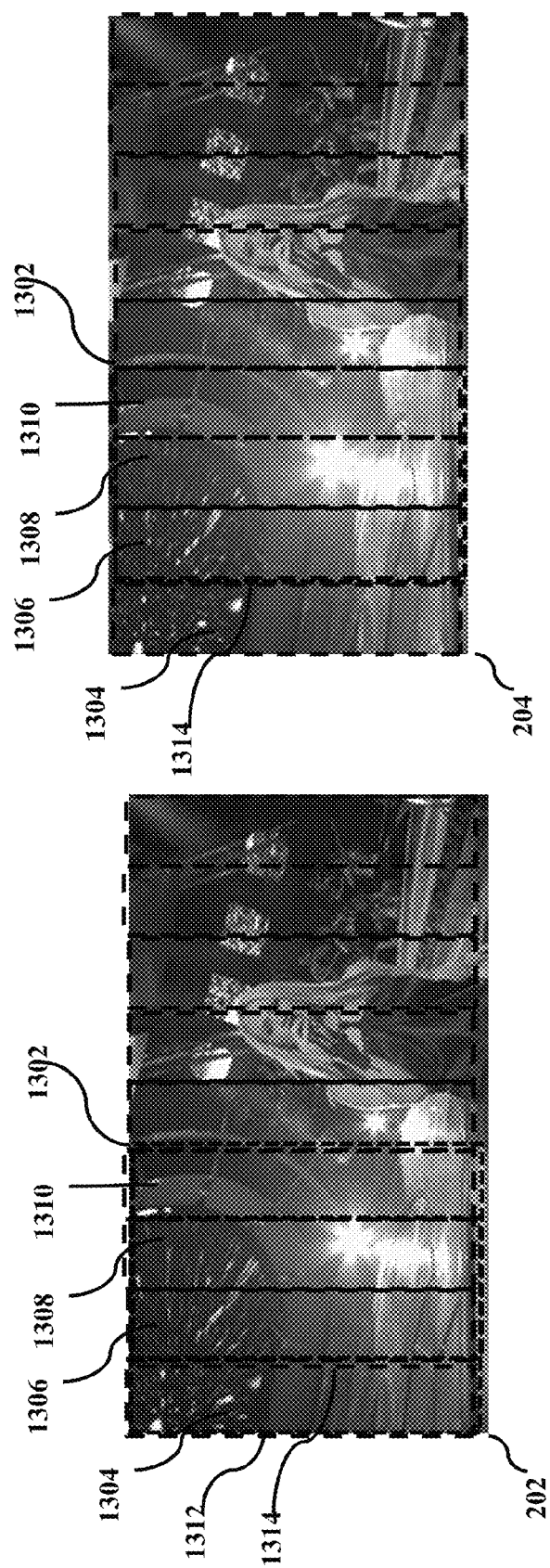
FIGS. 13A-B illustrate an image frame as divided into a plurality of sections.

In the embodiment discussed above with reference to FIG. 10, the individual sections of image data are analyzed. In other embodiments, sections may be analyzed in an overlapped manner. This is shown in FIGS. 13A-B. Without knowing where the strobe pixels are located, overlapped section partitions may enhance the chance that a section contains a majority of the strobe pixels, hence making the detection more robust.

FIGS. 13A-B illustrate image frame 200 as divided into a plurality of sections 1302. In FIG. 13A, sections 1304, 1306 and 1308 are grouped together as section 1312 for analysis. Alternatively, in FIG. 13A, sections 1306, 1308 and 1310 can be grouped together as section 1314 for analysis. It is clear that sections 1312 and 1314 overlap with each other. In FIG. 13B, sections 1306, 1308 and 1310 are grouped together as section 1314 for analysis.

The foregoing description of various preferred embodiments has been presented for purposes of illustration and description. It is not intended to be exhaustive or to limit embodiments to the precise forms disclosed, and obviously many modifications and variations are possible in light of the above teaching. The example embodiments, as described above, were chosen and described in order to best explain the principles of embodiments and their practical application to thereby enable others skilled in the art to best utilize embodiments and with various modifications as are suited to the particular use contemplated. It is intended that the scope of embodiments be defined by the claims appended hereto.

We claim:

1. A video processing device comprising:
a buffer operable to store frame image data for a plurality of video frames;
a luminance component operable to generate a first luminance value corresponding to a first image data from the buffered frame image data, and to generate a second luminance value corresponding to a second frame image data from the buffered frame image data;
a maximum threshold component operable to generate a maximum indicator signal when the difference between the second luminance value and the first luminance value is greater than a maximum threshold;
a minimum threshold component operable to generate a minimum indicator signal when the difference between the second luminance value and the first luminance value is less than a minimum threshold; and
a flagging component operable to generate a flagged signal based on one of the maximum indicator signal and the minimum indicator signal.

2. The video processing device of claim 1, wherein the flagging component is operable to generate the flagged signal as a first flagged signal indicating a potential strobe based on the maximum indicator signal.

3. The video processing device of claim 1, wherein the flagging component is operable to generate the flagged signal as a second flagged signal indicating no potential strobe based on the minimum indicator signal.

4. The video processing device of claim 1, further comprising a verification component operable to receive a plurality of flagged signals, and to generate a verification signal indicating a verified strobe, based on the received flagged signals.

5. The video processing device of claim 4,
wherein said verification component is further operable to calculate a count value based on the number of received flagged signals, and
wherein said verification component is further operable to generate the verification signal additionally based on the count value as compared to a predetermined count threshold.

6. The video processing device of claim 4,
wherein said verification component is further operable to receive a plurality of the first luminance value and the second luminance value, and
wherein said verification component is further operable to generate the verification signal additionally based on the first luminance value and the second luminance value.

7. The video processing device of claim 6,
wherein said verification component is further operable to calculate an average luminance value based on the first luminance value and the second luminance value, and
wherein said verification component is further operable to generate the verification signal additionally based on the average luminance value.

8. The video processing device of claim 6,
wherein said verification component is further operable to calculate a minimum luminance value based on the first luminance value and the second luminance value, and
wherein said verification component is further operable to generate the verification signal additionally based on the minimum luminance value.

9. The video processing device of claim 6,
wherein said verification component is further operable to calculate an average difference value based on the first luminance value and the second luminance value, and
wherein said verification component is further operable to generate the verification signal additionally based on the average difference value.

10. The video processing device of claim 1, further comprising:
an image dividing component operable to divide the frame image data for each of the plurality of video frames into respective sections of image data,
wherein said luminance component is operable to generate the first luminance value corresponding to a first section of the first image data from the buffered frame image data, and to generate a second luminance value corresponding to a second section of the second frame image data from the buffered frame image data.

11. A video processing method comprising:
storing, via a buffer, frame image data for a plurality of video frames;
generating, via a luminance component, a first luminance value corresponding to a first image data from the buffered frame image data;
generating, via the luminance component, a second luminance value corresponding to a second frame image data from the buffered frame image data;
generating, via a maximum threshold component, a maximum indicator signal when the difference between the second luminance value and the first luminance value is greater than a maximum threshold;
generating, via a minimum threshold component, a minimum indicator signal when the difference between the second luminance value and the first luminance value is less than a minimum threshold; and
generating, via a flagging component, a flagged signal based on one of the maximum indicator signal and the minimum indicator signal.

12. The video processing method of claim 11, wherein said generating a flagged signal comprises generating the flagged signal as a first flagged signal indicating a potential strobe based on the maximum indicator signal.

13. The video processing method of claim 11, wherein said generating a flagged signal comprises generating the flagged signal as a second flagged signal indicating no potential strobe based on the minimum indicator signal.

14. The video processing method of claim 11, further comprising:
receiving, via a verification component, a plurality of flagged signals; and
generating, via the verification component, a verification signal indicating a verified strobe, based on the received flagged signals.

15. The video processing method of claim 14, further comprising:
calculating, via the verification component, a count value based on the number of received flagged signals,
wherein said generating a verification signal comprises generating the verification signal additionally based on the count value as compared to a predetermined count threshold.

16. The video processing method of claim 14, further comprising:
receiving, via the verification component, the first luminance value and the second luminance value, and
wherein said generating a verification signal comprises generating the verification signal additionally based on the first luminance value and the second luminance value.

17. The video processing method of claim 16, further comprising:
calculating, via the verification component, an average luminance value based on the first luminance value and the second luminance value,
wherein said generating a verification signal comprises generating the verification signal additionally based on the average luminance value.

18. The video processing method of claim 16, further comprising:
calculating, via the verification component, a minimum luminance value based on the first luminance value and the second luminance value,
wherein said generating a verification signal comprises generating the verification signal additionally based on the minimum luminance value.

19. The video processing method of claim 16, further comprising:
calculating, via the verification component, an average difference value based on the first luminance value and the second luminance value,
wherein said generating a verification signal comprises generating the verification signal additionally based on the average difference value.

20. The video processing method of claim 11, further comprising:
dividing, via an image dividing component, the frame image data for each of the plurality of video frames into respective sections of image data,
wherein said generating a first luminance value comprises generating the first luminance value corresponding to a first section of the first frame image data from the buffered frame image data, and
wherein said generating a second luminance value comprises generating the second luminance value corresponding to a second section of the second frame image data from the buffered frame image data.

* * * * *